United States Patent
Fukuda et al.

(10) Patent No.: US 10,745,014 B2
(45) Date of Patent: Aug. 18, 2020

(54) ASSIST DEVICE

(71) Applicant: DENSO CORPORATION, Kariya, Aichi-pref. (JP)

(72) Inventors: Shotaro Fukuda, Kariya (JP); Hiroaki Niino, Kariya (JP); Koji Fujiki, Kariya (JP)

(73) Assignee: DENSO CORPORATION, Kariya, Aichi-Pref. (JP)

(*) Notice: Subject to any disclaimer, the term of this patent is extended or adjusted under 35 U.S.C. 154(b) by 8 days.

(21) Appl. No.: 16/089,035

(22) PCT Filed: Mar. 31, 2017

(86) PCT No.: PCT/JP2017/013709
§ 371 (c)(1),
(2) Date: Sep. 27, 2018

(87) PCT Pub. No.: WO2017/171040
PCT Pub. Date: Oct. 5, 2017

(65) Prior Publication Data
US 2019/0308627 A1 Oct. 10, 2019

(30) Foreign Application Priority Data

Mar. 31, 2016 (JP) .................. 2016-071832

(51) Int. Cl.
*B60W 30/18* (2012.01)
*B60W 50/00* (2006.01)
(Continued)

(52) U.S. Cl.
CPC ....... *B60W 30/18163* (2013.01); *B60R 21/00* (2013.01); *B60W 30/095* (2013.01);
(Continued)

(58) Field of Classification Search
None
See application file for complete search history.

(56) References Cited

U.S. PATENT DOCUMENTS

2009/0088925 A1* 4/2009 Sugawara ............. B60W 30/12
701/41
2015/0344033 A1* 12/2015 Fukuda ................. B60W 30/16
701/117

(Continued)

FOREIGN PATENT DOCUMENTS

JP 2001052297 A 2/2001
JP 2003-291685 A 10/2003
(Continued)

*Primary Examiner* — Thomas G Black
*Assistant Examiner* — Demetra R Smith-Stewart
(74) *Attorney, Agent, or Firm* — Maschoff Brennan

(57) ABSTRACT

An inter-vehicle calculation unit calculates a required inter-vehicle distance required between the own vehicle and forward/rear vehicles traveling in the lane to which the own vehicle moves during the lane change. The required inter-vehicle distance includes a first inter-vehicle distance and a second inter-vehicle distance. The first inter-vehicle distance is the distance required to allow the own vehicle or the forward/rear vehicles to adjust their velocity after the own vehicle changes lanes, and the first inter-vehicle distance is calculated by a first calculation unit. The second inter-vehicle distance is the distance required between the own vehicle and the forward/rear vehicles after the own vehicle or the forward/rear vehicles adjust their velocity, and the second inter-vehicle distance is calculated by a second calculation unit. A determination unit determines that the own vehicle can change lanes if the relative distance is equal to or greater than the required inter-vehicle distance.

5 Claims, 5 Drawing Sheets

(51) Int. Cl.
  *B62D 15/02* (2006.01)
  *B60W 30/12* (2020.01)
  *B60W 30/16* (2020.01)
  *G08G 1/16* (2006.01)
  *G08G 1/09* (2006.01)
  *B60R 21/00* (2006.01)
  *B60W 30/095* (2012.01)
  *B62D 6/00* (2006.01)

(52) U.S. Cl.
  CPC .......... *B60W 30/12* (2013.01); *B60W 30/162* (2013.01); *B60W 50/0098* (2013.01); *B62D 6/00* (2013.01); *B62D 15/0255* (2013.01); *G08G 1/09* (2013.01); *G08G 1/16* (2013.01); *B60W 2554/801* (2020.02)

(56) References Cited

U.S. PATENT DOCUMENTS

| 2015/0344034 | A1* | 12/2015 | Niino ............... B60W 30/16 |
| | | | 701/96 |
| 2016/0009283 | A1* | 1/2016 | Tokimasa ........... B60W 30/16 |
| | | | 701/96 |
| 2016/0240084 | A1* | 8/2016 | Takeuchi ............ G08G 1/165 |
| 2016/0297447 | A1* | 10/2016 | Suzuki ............... B60W 30/16 |
| 2017/0232966 | A1* | 8/2017 | Ishioka ........... B60W 30/18163 |
| | | | 701/96 |
| 2017/0240176 | A1* | 8/2017 | Aoki ................ B60W 40/04 |

FOREIGN PATENT DOCUMENTS

| JP | 2007-245835 | 9/2007 | |
| JP | 2008-094111 | 4/2008 | |
| JP | 2008-308099 A | 12/2008 | |
| JP | 2009-78735 A | 4/2009 | |
| JP | 2013107431 A | 6/2013 | |
| JP | 2015-93590 A | 5/2015 | |
| WO | 2007/123176 A1 | 11/2007 | |
| WO | WO-2007123176 A1 * | 11/2007 | ........... B60W 50/14 |

* cited by examiner

ASSIST DEVICE

CROSS-REFERENCE TO RELATED APPLICATION

This application is the U.S. national phase of International Application No. PCT/JP2017/013709 filed Mar. 31, 2017 which designated the U.S. and claims priority to Japanese Patent Application No. 2016-71832 filed Mar. 31, 2016, the contents of which are incorporated herein by reference.

TECHNICAL FIELD

The present disclosure relates to a technology for assisting lane change.

BACKGROUND ART

PTL 1 discloses a traveling assist device that assists traveling of a vehicle. This traveling assist device detects the relative distance and relative velocity between an own vehicle and another vehicle to calculate a level of collision risk that the own vehicle faces during the lane change based on the detected relative distance and relative velocity. The traveling assist device then determines whether the own vehicle can change lanes based on the relative distance, relative velocity, and level of collision risk.

CITATION LIST

Patent Literature

[PTL 1] JP 2009-78735 A

SUMMARY OF THE INVENTION

However, the inventors have found through their detailed study that the above technique has the following problem: if the relative velocity between the own vehicle and the other vehicle is large while the level of collision risk is low, the inter-vehicle distance between the own vehicle and the other vehicle is rapidly reduced after the lane change, providing a sense of discomfort to occupants.

The present disclosure provides a technique for assisting a lane change of an own vehicle without providing a sense of discomfort to occupants even when the relative velocity between the own vehicle and another vehicle is large.

An assist device according to an aspect of the present disclosure has functions of assisting the lane change of the own vehicle.

The assist device includes a first acquisition unit, a second acquisition unit, a relative calculation unit, an inter-vehicle calculation unit, a determination unit, and an assist unit.

The first acquisition unit acquires a traveling velocity of an own vehicle and a location of the own vehicle.

The second acquisition unit acquires traveling velocities of forward/rear vehicles and locations of the forward/rear vehicles. The forward/rear vehicles are traveling ahead of and behind the own vehicle in a lane to which the own vehicle moves during the lane change.

The relative calculation unit calculates relative distances between the own vehicle and the forward/rear vehicles based on the location of the own vehicle and the locations of the forward/rear vehicles.

The inter-vehicle calculation unit calculates a required inter-vehicle distance required between the own vehicle and the forward/rear vehicles when the own vehicle changes lanes based on the traveling velocity of the own vehicle and the traveling velocities of the forward/rear vehicles. The inter-vehicle calculation unit includes a first distance calculation unit and a second calculation unit. The first calculation unit calculates a first inter-vehicle distance required to allow the own vehicle or the forward/rear vehicles to adjust their velocities after the own vehicle changes lanes. The second calculation unit calculates a second inter-vehicle distance required between the own vehicle and the forward/rear vehicles after the own vehicle or the forward/rear vehicles adjust their velocities. The required inter-vehicle distance includes the first inter-vehicle distance and the second inter-vehicle distance.

The determination unit determines that the own vehicle can change lanes if the relative distance is equal to or greater than the required inter-vehicle distance.

The assist unit assists the lane change of the own vehicle in response to the determination unit determining that the own vehicle can change lanes.

According to the present disclosure, the required inter-vehicle distance includes not only the first inter-vehicle distance but also the second inter-vehicle distance. Therefore, even when the relative velocity between the own vehicle and the forward/rear vehicles is so large that the inter-vehicle distance between the own vehicle and these vehicles is rapidly reduced after the lane change, there is still a sufficient inter-vehicle distance owing to the second inter-vehicle distance included in the required inter-vehicle distance; providing almost no sense of discomfort to occupants. Thus, lane change assistance can be performed without providing a sense of discomfort to occupants even when the relative velocity between the own vehicle and other vehicles is large.

DESCRIPTION OF EMBODIMENTS

Embodiments of the present disclosure will be described based on the drawings.

[1. Overall Configuration]

A configuration of an assist device 1 will be described based on FIGS. 1 and 2. The assist device 1 is an in-vehicle device mounted in a vehicle. Hereinafter, the vehicle equipped with the assist device 1 is referred to as an own vehicle. The assist device 1 has the function of assisting the own vehicle in changing lanes.

The assist device 1 mainly includes a well-known microcomputer having a CPU 3 and a memory 5. The memory 5 is a semiconductor memory such as a RAM, a ROM, or a flash memory. The CPU 3 executes a program stored in a non-transitory tangible recording medium, whereby various functions of the assist device 1 are implemented. In this example, the memory 5 corresponds to the non-transitory tangible recording medium with the program stored therein. Once the program is executed, the method corresponding to the program is executed. Note that one or more microcomputers may constitute the assist device 1.

Figure 2:
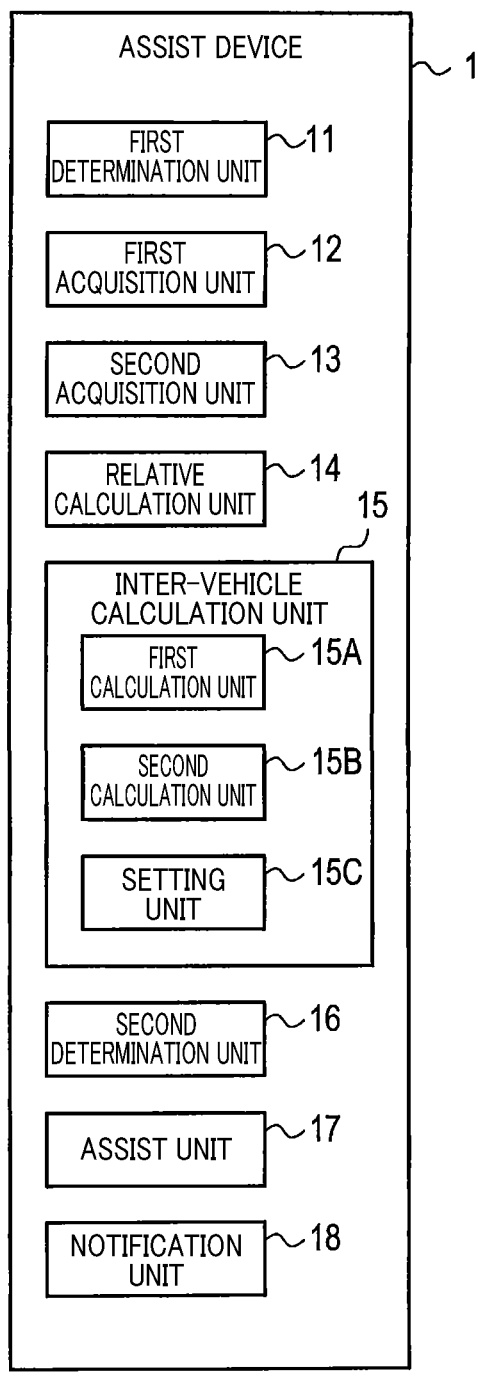
FIG. 2 is a block diagram illustrating a functional configuration of the assist device 1.

As illustrated in FIG. 2, the assist device 1 includes a first determination unit 11, a first acquisition unit 12, a second acquisition unit 13, a relative calculation unit 14, an inter-vehicle calculation unit 15, a second determination unit 16, an assist unit 17, and a notification unit 18 as a functional configuration that is implemented as the CPU 3 executes the program. The inter-vehicle calculation unit 15 includes a first calculation unit 15A, a second calculation unit 15B, and a setting unit 15C. The method to implement these components constituting the assist device 1 is not limited to software and some or all of the components may be executed using hardware including a combination of logic circuit and analog circuit and the like.

Figure 1:
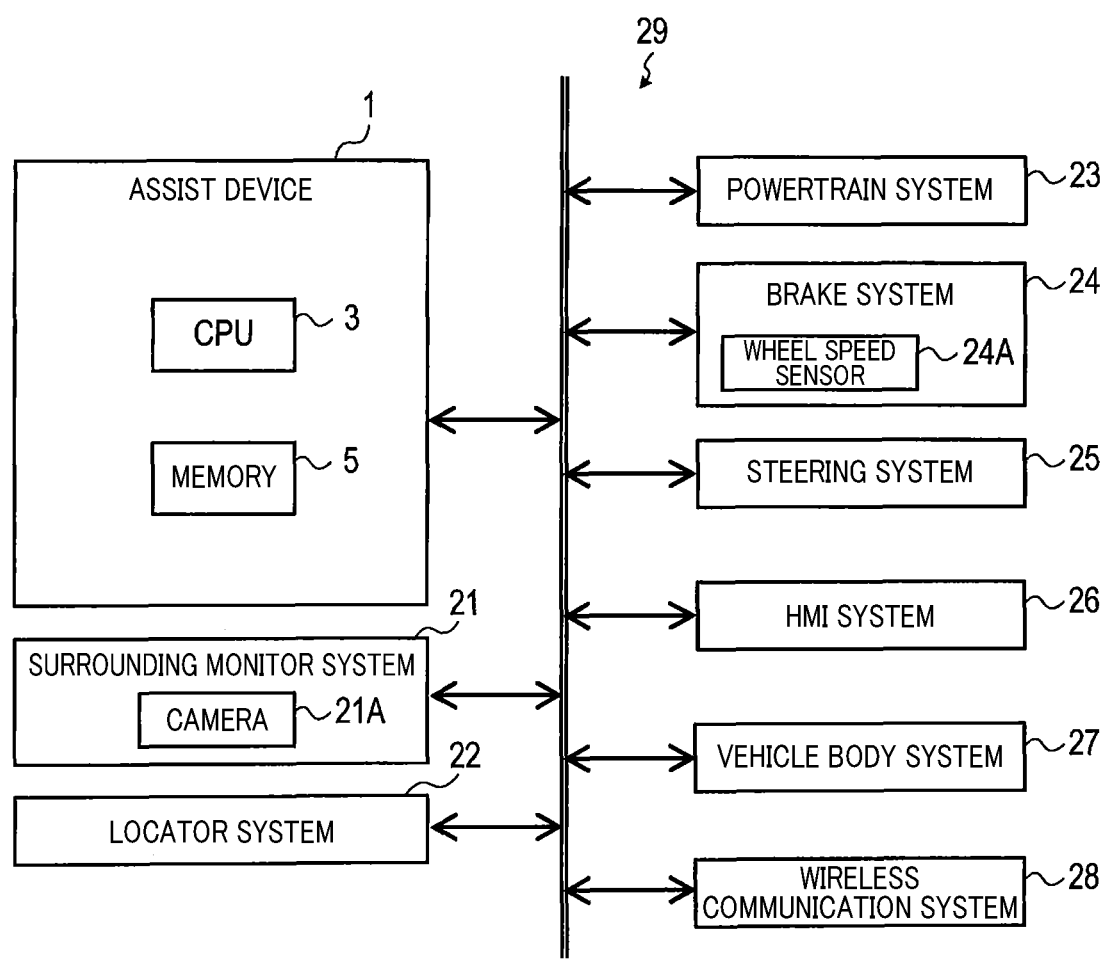
FIG. 1 is a block diagram illustrating an assist device 1 and a configuration associated with the assist device 1.

As illustrated in FIG. 1, the own vehicle includes a surrounding monitor system 21, a locator system 22, a powertrain system 23, a brake system 24, a steering system 25, an HMI system 26, a vehicle body system 27, and a wireless communication system 28 in addition to the assist device 1. The HMI stands for a human machine interface.

The surrounding monitor system 21 includes a camera 21A and other well-known sensors. The camera 21A captures an area surrounding the own vehicle to create image data. The surrounding monitor system 21 transmits image data created by the camera 21A and detection results provided by other sensors to the assist device 1.

The locator system 22 includes a GPS and a storage device with map information stored therein. The locator system 22 has the function of acquiring a location of the own vehicle. The locator system 22 transmits information on the location of the own vehicle to the assist device 1.

The powertrain system 23 has a function of controlling a powertrain of the own vehicle. The brake system 24 has a function of braking the own vehicle. The brake system 24 also includes a wheel speed sensor 24A, The wheel speed sensor 24A detects a rotational speed of wheels of the own vehicle as a signal. The brake system 24 transmits a detection signal provided by the wheel speed sensor 24A to the assist device 1. The assist device 1 can calculate a velocity of the own vehicle using the detection signal provided by the wheel speed sensor 24A. The steering system 25 has a function of steering the own vehicle.

The HMI system 26 accepts operations from the own vehicle's occupants. The HMI system 26 also notifies the own vehicle's occupants of various types of information about the own vehicle.

The vehicle body system 27 has a function of performing door lock control, light control, turn signal flashing control, turn signal condition notification, and the like for the own vehicle. The wireless communication system 28 has a function of communicating with other vehicles and communicating with infrastructure.

The assist device 1, the surrounding monitor system 21, the locator system 22, the powertrain system 23, the brake system 24, the steering system 25, the HMI system 26, the vehicle body system 27, and the wireless communication system 28 are components of the own vehicle. These components are connected to each other by an on-board LAN 29. These components can transmit and receive information over the on-board LAN 29.

[2. Process]

Figure 3:
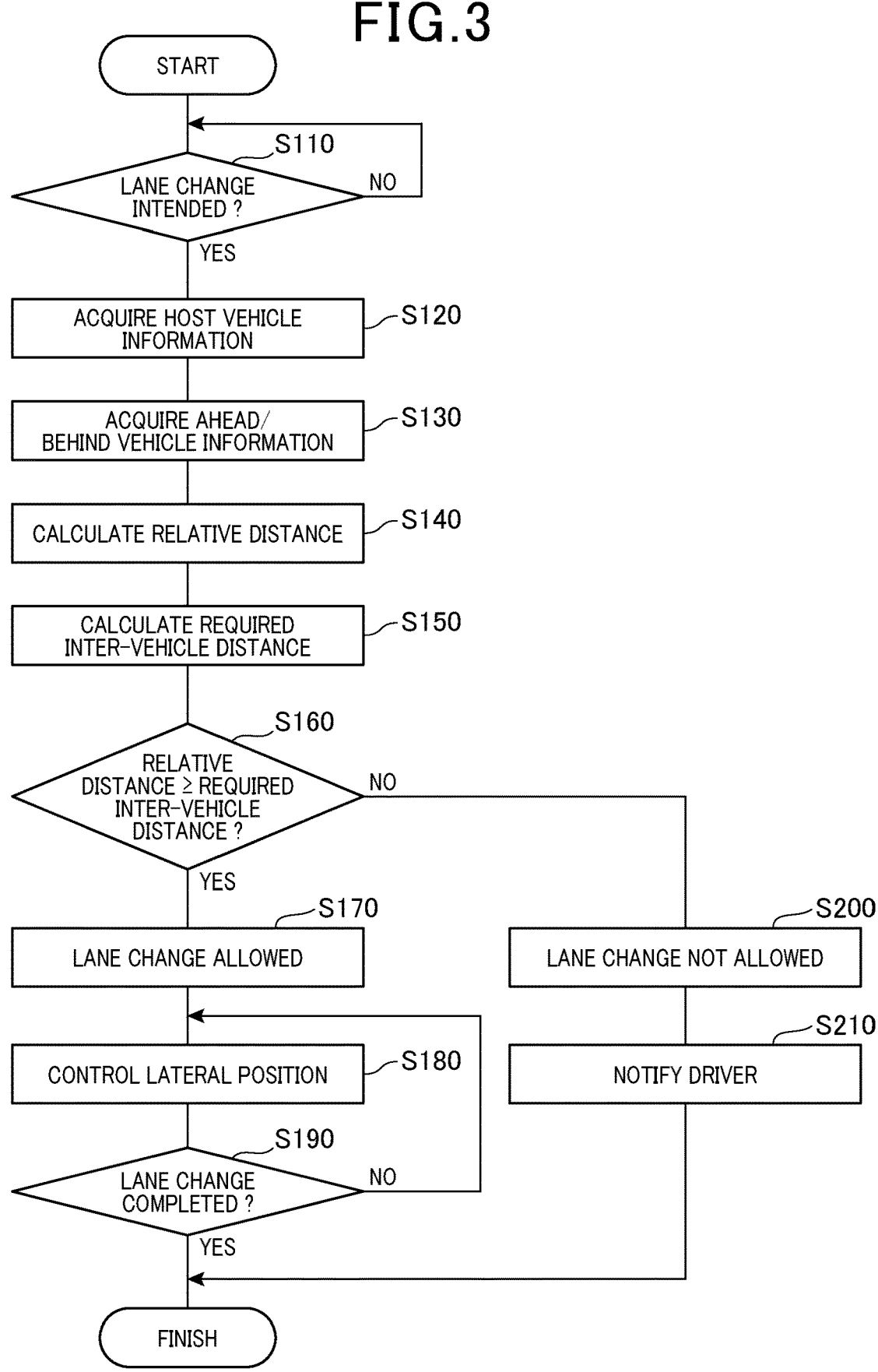
FIG. 3 is a flowchart illustrating an assist process that is executed by the assist device 1.
Figure 4:
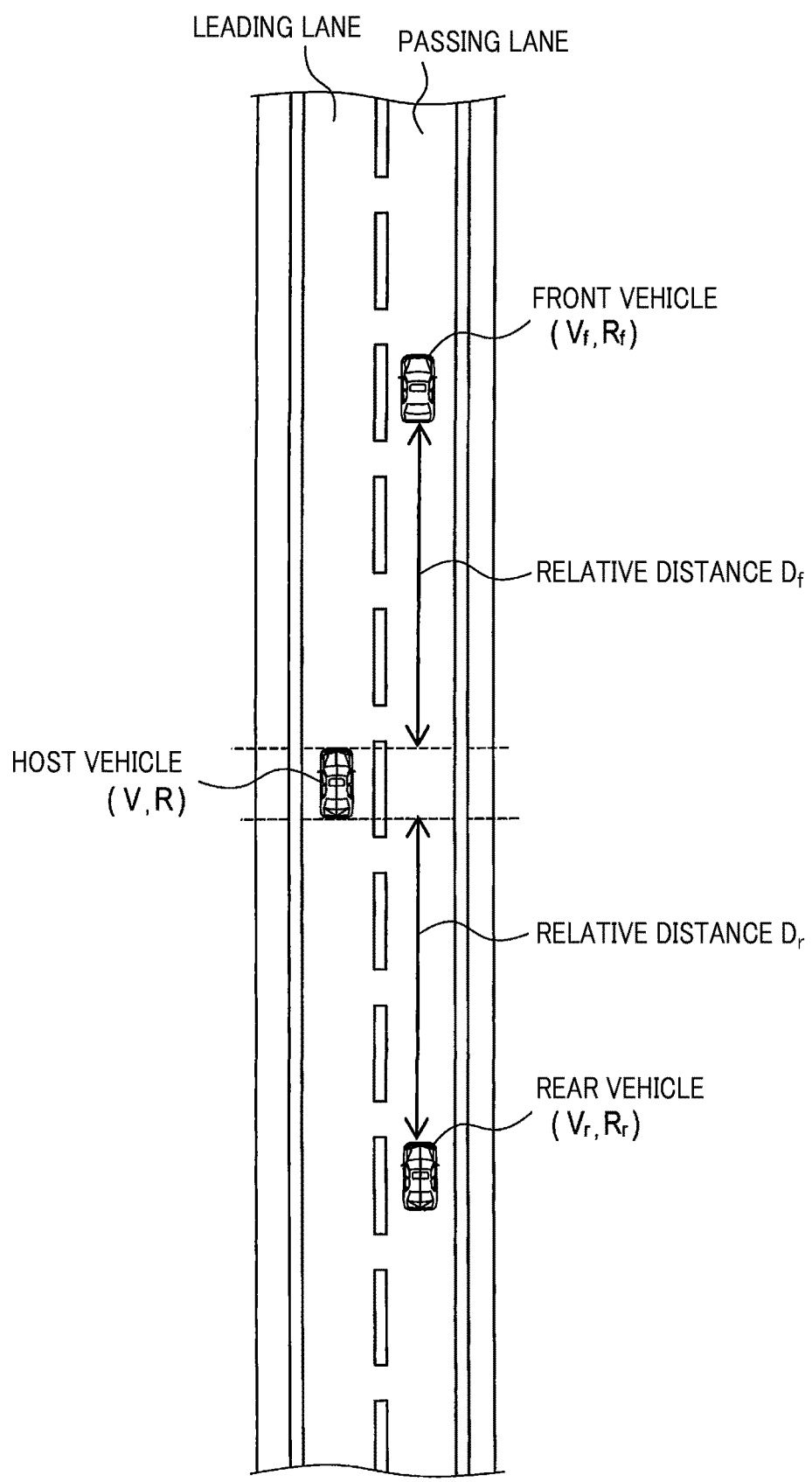
FIG. 4 is a diagram for explaining the assist process.

Next, an assist process that is executed by the assist device 1 will be described using a flowchart of FIG. 3, a functional block diagram of FIG. 2, and explanatory diagrams of FIGS. 4 to 6.

First, whether to change lanes is determined in S110. More specifically, the first determination unit 11 determines to change lanes in response to detecting at least one of the driver's intention to change lanes and the system's intention to change lanes. In contrast, the first determination unit 11 determines not to change lanes in response to detecting neither the driver's intention to change lanes nor the system's intention to change lanes. The first determination unit 11 determines that the driver has the intention of changing lanes in response to detecting a steering operation or a turn signal operation. The first determination unit 11 determines that the steering system has the intention of changing lanes in response to detecting the own vehicle's steering commend for the steering system 25. If the first determination unit 11 determines to change lanes, the process proceeds to S120. If the first determination unit 11 determines not to change lanes, S110 is executed again.

In S120, information about the own vehicle is acquired. More specifically, the first acquisition unit 12 acquires the location R of the own vehicle using the locator system 22. The first acquisition unit 12 acquires the velocity V of the own vehicle using a detection signal provided by the wheel speed sensor 24A. Thereafter, the process proceeds to S130.

In S130, information about forward/rear vehicles is acquired. More specifically, the second acquisition unit 13 acquires a traveling velocity Vf of a front vehicle and a location Rf of the front vehicle using the wireless communication system 28. The second acquisition unit 13 acquires a traveling velocity Vr of a rear vehicle and the location Rr of the rear vehicle using the wireless communication system 28. The forward/rear vehicles are vehicles traveling in a passing lane to which the own vehicle moves during the lane change. The front vehicle is one of the forward/rear vehicles traveling ahead of the own vehicle. The rear vehicle is one of the forward/rear vehicles traveling behind the own vehicle. The process proceeds to S140 thereafter.

In S140, relative distances between the own vehicle and the forward/rear vehicles are calculated. More specifically, the relative calculation unit 14 calculates the relative distance Df between the own vehicle and the front vehicle from the location R of the own vehicle and the location Rf of the front vehicle. The relative calculation unit 14 calculates the relative distance Dr between the own vehicle and the rear vehicle from the location R of the own vehicle and the location Rr of the rear vehicle. The process proceeds to S150 thereafter.

In S150, a required inter-vehicle distance is calculated. More specifically, the inter-vehicle calculation unit 15 calculates a required inter-vehicle distance required between the own vehicle and another vehicle when the own vehicle changes lanes. The required inter-vehicle distance Df_th between the own vehicle and the front vehicle and the required inter-vehicle distance Dr_th between the own vehicle and the rear vehicle are calculated using mathematical expressions (1) below

[Math. 1]

$$D_{f\_th} = \begin{cases} a_1 \Delta V + b_1 V + C_1 & (\Delta V_f < \Delta V_1) \\ Df_{th\_min} & (\Delta V_f \geq \Delta V_1) \end{cases} \quad (1)$$

$$D_{r\_th} = \begin{cases} a_2 \Delta V + b_2 V + C_2 & (\Delta V_r \geq \Delta V_2) \\ Dr_{th\_min} & (\Delta V_r < \Delta V_2) \end{cases}$$

In the mathematical expression for the required inter-vehicle distance Df_th, ΔV and ΔVf represent the relative velocity between the own vehicle and the front vehicle.

A symbol a1 represents a predicted time that is left before the own vehicle collides with the front vehicle when there is a velocity difference between the own vehicle and the front vehicle during the lane change. A symbol b1 represents an inter-vehicle time required between the own vehicle and the front vehicle when there is no velocity difference between the own vehicle and the front vehicle during the lane change. The symbols a1, b1, c1, Dfth_min, and ΔV1 are set in advance in consideration of the sensitivity of the own vehicle's occupants and the front vehicle's occupants.

In the mathematical expression for the required inter-vehicle distance Dr_th, ΔV and ΔVr represent the relative velocity between the own vehicle and the rear vehicle. A symbol a2 represents a predicted time that is left before the own vehicle collides with the rear vehicle when there is a velocity difference between the own vehicle and the rear vehicle during the lane change. A symbol b2 represents an inter-vehicle time required between the own vehicle and the rear vehicle when there is no velocity difference between the own vehicle and the rear vehicle during the lane change. The symbols a2, b2, c2, Drth_min, and ΔV2 are set in advance in consideration of the sensitivity of the own vehicle's occupants and the rear vehicle's occupants.

The first calculation unit 15A calculates the product of a1 and ΔV and the product of a2 and ΔV. The product of a1 and ΔV and the product of a2 and ΔV each corresponds to a first inter-vehicle distance. The first inter-vehicle distance is the distance required to allow the own vehicle or the forward/rear vehicles to adjust their velocity after the own vehicle changes lanes. The second calculation unit 15B calculates the product of b1 and V and the product of b2 and V The product of b1 and V and the product of b2 and V each corresponds to a second inter-vehicle distance. The second inter-vehicle distance is the distance required between the own vehicle and the forward/rear vehicles after the own vehicle or the forward/rear vehicles adjust their velocity. The setting unit 15C sets c1 and c2. Note that respective c1 and c2 corresponds to a third inter-vehicle distance. The third inter-vehicle distance is the distance required between the own vehicle and the forward/rear vehicles when both the own vehicle and the forward/rear vehicles are stationary.

Thereafter, the process proceeds to S160.

In S160, it is determined whether the own vehicle can change lanes. More specifically, the second determination unit 16 determines whether the relative distance is equal to or greater than the required inter-vehicle distance. The second determination unit 16 corresponds to a determination unit in the claims. If conditional expressions (2) below are satisfied, that is, if the relative distance Df is equal to or greater than the required inter-vehicle distance Df_th and the relative distance Dr is equal to or greater than the required inter-vehicle distance Dr_th, the process proceeds to S170. If conditional expressions (2) are not satisfied, the process proceeds to S200.

[Math. 2]

$$D_f \geq D_{f\_th}$$

$$D_r \geq D_{r\_th} \quad (2)$$

Figure 5:
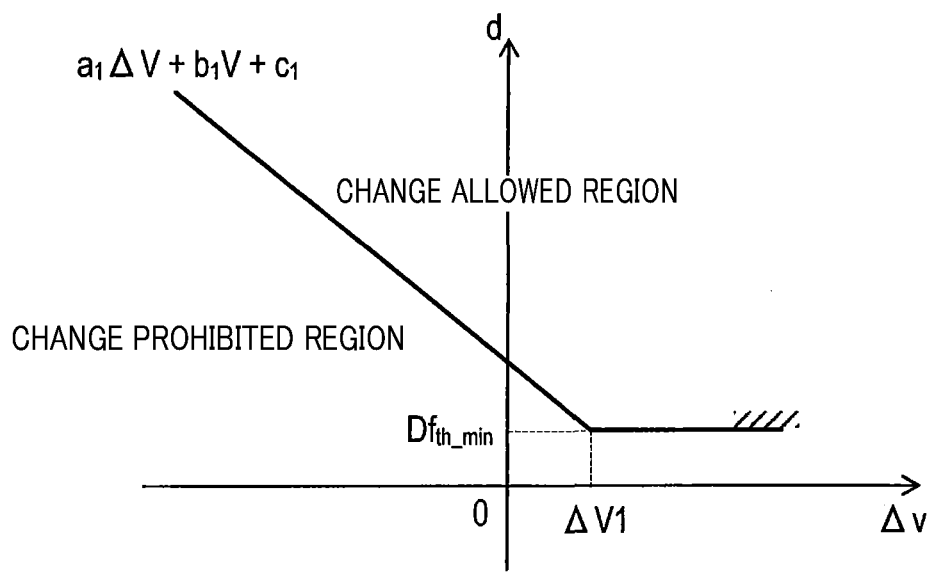
FIG. 5 is a diagram for explaining the assist process.
Figure 6:
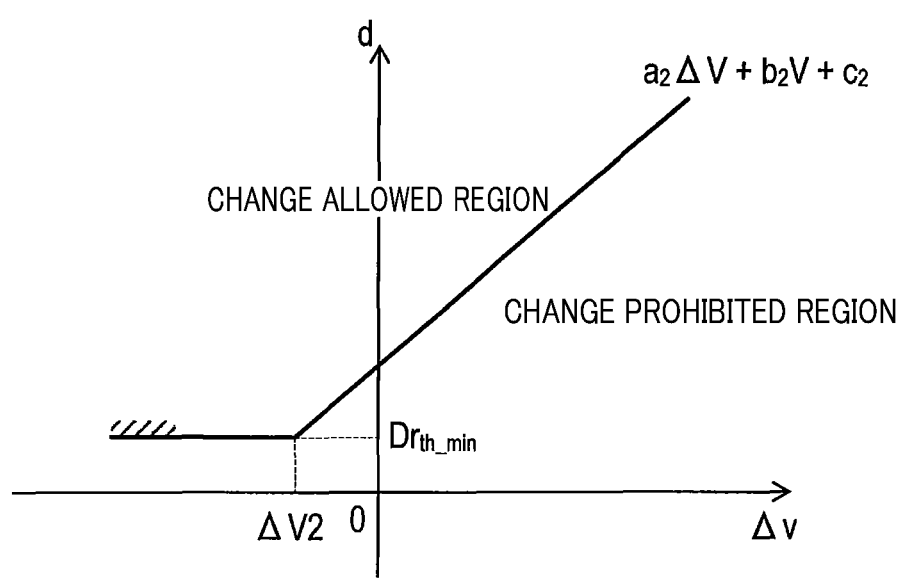
FIG. 6 is a diagram for explaining the assist process.

FIG. 5 depicts a two-dimensional planar graph, with the horizontal axis representing the relative velocity ΔV between the own vehicle and the front vehicle, and the vertical axis representing the relative distance Df between the own vehicle and the front vehicle. In this graph, a part where the relative distance Df is equal to or greater than the required inter-vehicle distance Df_th is a change allowed region for determining that the own vehicle can change lanes, and a part where the relative distance Df is less than the required inter-vehicle distance Df_th is a change prohibited region for determining that the own vehicle is not allowed to change lanes. FIG. 6 depicts a two-dimensional planar graph, with the horizontal axis representing the relative velocity ΔV between the own vehicle and the rear vehicle, and the vertical axis representing the relative distance Dr between the own vehicle and the rear vehicle. In this graph, a part where the relative distance Dr is equal to or greater than the required inter-vehicle distance Dr_th is a change allowed region, and a part where the relative distance Df is less than the required inter-vehicle distance Df_th is a change prohibited region.

In S170, the second determination unit 16 determines that the own vehicle can change lanes. Thereafter, the process proceeds to S180.

In S180, lane change assistance is performed. More specifically, the assist unit 17 controls the powertrain system 23, the brake system 24, and the steering system 25 to control the location of the own vehicle in the right-left direction. Thereafter, the process proceeds to S190.

In S190, the assist unit 17 determines whether the own vehicle has completed the lane change. If it is determined that the own vehicle has not completed the lane change yet, the process proceeds to S180. If it is determined that the own vehicle has already completed the lane change, the process is finished.

In S200, the second determination unit 16 determines that the own vehicle is not allowed to change lanes. Thereafter, the process proceeds to S210.

In S210, the driver is notified that the own vehicle is not allowed to change lanes. More specifically, the notification unit 18 controls the HMI system 26 to notify the driver that the own vehicle is not allowed to change lanes with sound, display, and the like. Thereafter, the process is finished.

3. Effects

According to the first embodiment described in detail above, the following effects are obtained.

(1) The required inter-vehicle distance includes not only the first inter-vehicle distance but also the second inter-vehicle distance. Therefore, even when the relative velocity between the own vehicle and the forward/rear vehicles is so large that the inter-vehicle distance between the own vehicle and these vehicles is rapidly reduced after the lane change, there is still a sufficient inter-vehicle distance owing to the second inter-vehicle distance included in the required inter-vehicle distance. Thus, lane change assistance can be performed without providing a sense of discomfort to occupants even when the relative velocity between the own vehicle and other vehicles is large.

4. Other Embodiments

The embodiment for carrying out the present invention has been described so far. However, the present invention is not limited to the above embodiment, but can be put into practice in various ways.

(1) in S160, it may be determined whether the own vehicle can change lanes or not using conditional expressions (3) below instead of conditional expressions (2).

[Math. 3]

$$D_f \geq -\frac{\Delta V_f{}^2}{d_1} + b_1 V_f + c_1 \quad (3)$$

$$D_r \geq -\frac{\Delta V_r{}^2}{d_2} + b_2 V + c_2$$

A symbol d1 represents the permissible deceleration of the own vehicle as a following vehicle set in advance in consideration of the sensitivity of the own vehicle's occupants and the front vehicle's occupants. The following vehicle is either the own vehicle or the forward/rear vehicles that follow the other. A symbol d2 represents the permissible deceleration of the rear vehicle as a following vehicle set in advance in consideration of the sensitivity of the own vehicle's occupants and the rear vehicle's occupants.

The first calculation unit 15A calculates the first inter-vehicle distance by dividing the square of the relative velocity $\Delta V_f$ between the own vehicle and the front vehicle by the permissible deceleration d1 of the own vehicle, and dividing the square of the relative velocity $\Delta V_r$ between the own vehicle and the rear vehicle by the permissible deceleration d2 of the own vehicle.

The functions and effects similar to those of the above embodiment can be achieved in this manner.

(2) In the above embodiment, a plurality of functions of a single component may be implemented by a plurality of components, or a single function of a single component may be implemented by a plurality of components. A plurality of functions of a plurality of components may be implemented by a single component, or a single function that is implemented by a plurality of components may be implemented by a single component. Part of the configuration of the above embodiment may be omitted. At least part of the configuration of the above embodiment may be added to or replaced by the configuration of another embodiment. Note that every aspect included in the technical idea specified only by the terms described in the claims is an embodiment of the present invention.

(3) In addition to the above-mentioned assist device 1, the present invention can be implemented in various forms such as a system including the assist device 1 as a component, a program for causing a computer to function as the assist device 1, a non-transitory tangible recording medium such as a semiconductor memory that stores the program, and an assist method.

The invention claimed is:

1. An assist device that assists a lane change of an own vehicle, the assist device comprising:
    a first acquisition unit configured to acquire a traveling velocity of the own vehicle and a location of the own vehicle;
    a second acquisition unit configured to acquire a traveling velocity of forward/rear vehicles and locations of the forward/rear vehicles, the forward/rear vehicles being traveling ahead of and behind the own vehicle in a lane to which the own vehicle moves during the lane change;
    a relative calculation unit configured to calculate a relative distance between the own vehicle and the forward/rear vehicles based on the location of the own vehicle and the locations of the forward/rear vehicles;
    an inter-vehicle calculation unit configured to calculate a required inter-vehicle distance required between the own vehicle and the forward/rear vehicles in response to the own vehicle changing lanes based on the traveling velocity of the own vehicle and the traveling velocity of the forward/rear vehicles;
    a determination unit configured to determine that the own vehicle can change lanes if the relative distance is equal to or greater than the required inter-vehicle distance; and
    an assist unit configured to assist the lane change of the own vehicle in response to the determination unit determining that the own vehicle can change lanes, wherein
    the inter-vehicle calculation unit includes:
    a first calculation unit configured to calculate a first inter-vehicle distance required to allow the own vehicle or the forward/rear vehicles to adjust their velocity after the own vehicle changes lanes; and
    a second calculation unit configured to calculate a second inter-vehicle distance required between the own vehicle and the forward/rear vehicles after the own vehicle or the forward/rear vehicles adjust their velocity, wherein
        the required inter-vehicle distance includes the first inter-vehicle distance and the second inter-vehicle distance, wherein
    the first calculation unit is configured to calculate the first inter-vehicle distance by multiplying:
        a predicted time that is left before the own vehicle collides with the forward/rear vehicles in response to there being a velocity difference between the own vehicle and the forward/rear vehicles during the lane change; and
        a relative velocity between the own vehicle and the forward/rear vehicles.

2. An assist device that assists a lane change of an own vehicle, the assist device comprising:
    a first acquisition unit configured to acquire a traveling velocity of the own vehicle and a location of the own vehicle;
    a second acquisition unit configured to acquire a traveling velocity of forward/rear vehicles and locations of the forward/rear vehicles, the forward/rear vehicles being traveling ahead of and behind the own vehicle in a lane to which the own vehicle moves during the lane change;
    a relative calculation unit configured to calculate a relative distance between the own vehicle and the forward/rear vehicles based on the location of the own vehicle and the locations of the forward/rear vehicles;
    an inter-vehicle calculation unit configured to calculate a required inter-vehicle distance required between the own vehicle and the forward/rear vehicles in response to the own vehicle changing lanes based on the traveling velocity of the own vehicle and the traveling velocity of the forward/rear vehicles;
    a determination unit configured to determine that the own vehicle can change lanes if the relative distance is equal to or greater than the required inter-vehicle distance; and
    an assist unit configured to assist the lane change of the own vehicle in response to the determination unit determining that the own vehicle can change lanes, wherein
    the inter-vehicle calculation unit includes:
    a first calculation unit configured to calculate a first inter-vehicle distance required to allow the own vehicle or the forward/rear vehicles to adjust their velocity after the own vehicle changes lanes; and a second calculation unit configured to calculate a second inter-vehicle distance required between the own vehicle and the forward/rear vehicles after the own vehicle or the forward/rear vehicles adjust their velocity, wherein the required inter-vehicle distance includes the first inter-vehicle distance and the second inter-vehicle distance, wherein the first calculation unit is configured to calculate the first inter-vehicle distance by dividing a square of a relative velocity between the own vehicle and the forward/rear vehicles by a permissible deceleration that is a deceleration permissible for a following vehicle that is either the own vehicle or the forward/rear vehicles that follow the other.

3. An assist device that assists a lane change of an own vehicle, the assist device comprising:
- a first acquisition unit configured to acquire a traveling velocity of the own vehicle and a location of the own vehicle;
- a second acquisition unit configured to acquire a traveling velocity of forward/rear vehicles and locations of the forward/rear vehicles, the forward/rear vehicles being traveling ahead of and behind the own vehicle in a lane to which the own vehicle moves during the lane change;
- a relative calculation unit configured to calculate a relative distance between the own vehicle and the forward/rear vehicles based on the location of the own vehicle and the locations of the forward/rear vehicles;
- an inter-vehicle calculation unit configured to calculate a required inter-vehicle distance required between the own vehicle and the forward/rear vehicles in response to the own vehicle changing lanes based on the traveling velocity of the own vehicle and the traveling velocity of the forward/rear vehicles;
- a determination unit configured to determine that the own vehicle can change lanes if the relative distance is equal to or greater than the required inter-vehicle distance; and
- an assist unit configured to assist the lane change of the own vehicle in response to the determination unit determining that the own vehicle can change lanes, wherein the inter-vehicle calculation unit includes:
- a first calculation unit configured to calculate a first inter-vehicle distance required to allow the own vehicle or the forward/rear vehicles to adjust their velocity after the own vehicle changes lanes; and
- a second calculation unit configured to calculate a second inter-vehicle distance required between the own vehicle and the forward/rear vehicles after the own vehicle or the forward/rear vehicles adjust their velocity, wherein the required inter-vehicle distance includes the first inter-vehicle distance and the second inter-vehicle distance, wherein the second calculation unit is configured to calculate the second inter-vehicle distance by multiplying:
- an inter-vehicle time required between the own vehicle and the forward/rear vehicles in response to there being no velocity difference between the own vehicle and the forward/rear vehicles during the lane change; and
- the traveling velocity of the own vehicle.

4. The assist device according to claim 1, wherein the inter-vehicle calculation unit further includes a setting unit configured to set a third inter-vehicle distance required between the own vehicle and the forward/rear vehicles in response to both the own vehicle and the forward/rear vehicles being stationary, and the required inter-vehicle distance includes the third inter-vehicle distance in addition to the first inter-vehicle distance and the second inter-vehicle distance.

5. The assist device according to claim 1, wherein the assist device further includes a notification unit configured to notify a driver that the own vehicle is not allowed to change lanes in response to the determination unit determining that the own vehicle is not allowed to change lanes.

* * * * *